United States Patent [19]

Yazawa et al.

[11] Patent Number: 5,677,860

[45] Date of Patent: Oct. 14, 1997

[54] OVERFLOW AND UNDERFLOW PROCESSING CIRCUIT OF A BINARY ADDER

[75] Inventors: Minobu Yazawa; Natsuko Matsuo, both of Hyogo, Japan

[73] Assignee: Mitsubishi Denki Kabushiki Kaisha, Tokyo, Japan

[21] Appl. No.: 324,643

[22] Filed: Oct. 18, 1994

[30] Foreign Application Priority Data

Oct. 19, 1993 [JP] Japan .................. 5-260732
Sep. 26, 1994 [JP] Japan .................. 6-229965

[51] Int. Cl.[6] .................. G06F 7/38; G06F 11/00
[52] U.S. Cl. .................. 364/745; 364/737
[58] Field of Search .................. 364/715.04, 737, 364/745, 736.5, 768, 784, 786, 787, 788

[56] References Cited

U.S. PATENT DOCUMENTS 4,706,209 11/1987 Picco .................. 364/745
4,722,066 1/1988 Armer et al. .................. 364/745
4,768,160 8/1988 Yokoyama .................. 364/745
4,819,198 4/1989 Noll et al. .................. 364/787
5,289,396 2/1994 Taniguchi .................. 364/737
5,448,509 9/1995 Lee et al. .................. 364/737

FOREIGN PATENT DOCUMENTS 58-151646 9/1983 Japan .
3-62124 3/1991 Japan .
3-176733 7/1991 Japan .
4-45856 7/1992 Japan .

Primary Examiner—Chuong D. Ngo
Attorney, Agent, or Firm—Lowe, Price, LeBlanc & Becker

[57] ABSTRACT

Two input data X (7), Y (7), . . . , X (0), Y (0) are input to a plurality of full adders, and an overflow/underflow signal of each full adder is input to a full adder of a higher level. An overflow/underflow signal Co of the full adder of the most significant bit and data Y (7) are applied to an EXOR gate to obtain an exclusive OR. According to an output signal of the EXOR gate, an added output of each full adder or data Y (7) is selected by a selector, whereby a straight binary signal is output.

11 Claims, 15 Drawing Sheets

| CALCULATION | A+B | |
|---|---|---|
| INPUT | A: 8bSTB | 0~255 |
| | B: 8b2sC | -128~127 |
| OUTPUT | CALCULATE: 10b2sC | -128~382 |
| | S: 8bSTB | 0~255 |

| A7 | B7 | Co6 0 | Co6 1 | Co7 Co60 | Co7 1 | exor(B7,Co7) Co60 | exor(B7,Co7) 1 |
|---|---|---|---|---|---|---|---|
| 0 0~128 | 0 0~127 | OK | OK | 0 | 0 | 0 | 0 |
| 0 0~128 | 1 -128~-1 | UF | OK | 0 | 1 | 1 | 0 |
| 1 128~255 | 1 -128~-1 | OK | OK | 1 | 1 | 0 | 0 |
| 1 128~255 | 0 0~127 | OK | OF | 0 | 1 | 0 | 1 |

FIG.4

| INPUT A DATA | INPUT B DATA | OVERFLOW/ UNDERFLOW STATE | WHEN OVERFLOW/ UNDERFLOW | |
|---|---|---|---|---|
| | | | OUTPUT MSB···LSB | Co 7 |
| AT LEAST 128 MSB : 1 | POSITIVE MSB : 0 | OVERFLOW | 111···1 $\overline{B7}$ / A7 | 1 |
| NOT MORE THAN 127 MSB : 0 | NEGATIVE MSB : 1 | UNDERFLOW | 000···0 $\overline{B7}$ / A7 | 0 |

FIG.7

| A | B | C | D | E | F | G | H |
|---|---|---|---|---|---|---|---|
| 0 | 0 | 0~127 | 0~127 | 0~255 | 256~511 | 0 | 1 |
| 0 | 1 | 0~127 | -128~ -1 | -128~ -1 | 0~255 | 1 | 0 |
| 1 | 1 | 128~255 | -128~ -1 | -128~ -1 | 0~255 | 1 | 0 |
| 1 | 0 | 128~255 | 0~127 | 0~255 | 256~511 | 0 | 1 |

FIG.8
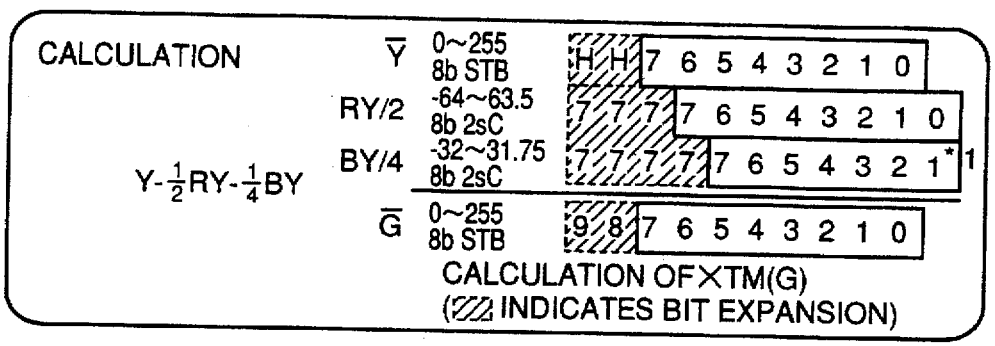
FIG.9
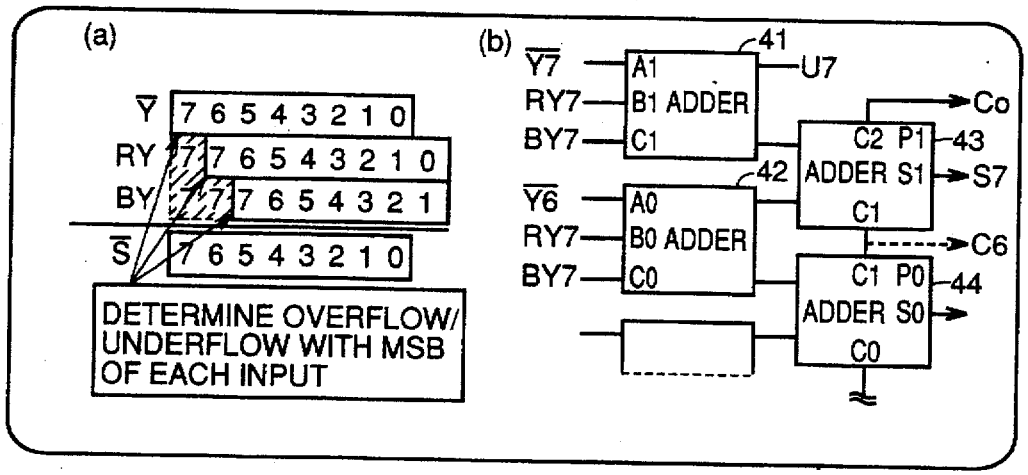
FIG.10

| RY7 | BY7 | Y7 | | | | | Output |
|---|---|---|---|---|---|---|---|
| 0 | 0 | 0 | 1 | 0 | | | |
| 0 | 1 | 0 | 0 | 1 | | | |
| 1 | 1 | 0 | 0 | 1 | | | |
| 1 | 0 | 0 | 0 | 1 | | | |
| OFUF | | OUTPUT PREDICTION VALUE | 00 | FF | | | |

Co=1

| RY7 | BY7 | Y7 | | | | | |
|---|---|---|---|---|---|---|---|
| 0 | 0 | 0 | 1 | 0 | | | |
| 0 | 1 | 1 | 0 | 0 | | | |
| 1 | 1 | 1 | 0 | 0 | | | |
| 1 | 0 | 0 | 1 | 0 | | | |
| OFUF | | OUTPUT PREDICTION VALUE | 00 | FF | | | |

FIG.15

| | | | | | | | | | | |
|---|---|---|---|---|---|---|---|---|---|---|
| H | -256~255 9bit 2sC | 8 | 7 | 6 | 5 | 4 | 3 | 2 | 1 | 0 |
| +V | -256~255 9bit 2sC | 8 | 7 | 6 | 5 | 4 | 3 | 2 | 1 | 0 |
| OUTPUT EG | -128~127 8bit 2sC | ▨8 | 7 | 6 | 5 | 4 | 3 | 2 | 1 | 0 |

FIG.17

S7=1
exor(H8,V8)=1    exor(H8,V8)=0

| V7 | H7 | V8 0 | 1 |
|----|----|------|---|
| 0  | 0  | 1    | 1 |
| 0  | 1  | 1    | 1 |
| 1  | 1  | 1    | 0 |
| 1  | 0  | 1    | 1 |

| V7 | H7 |   |
|----|----|---|
| 0  | 0  | 0 |
| 0  | 1  | 0 |
| 1  | 1  | 1 |
| 1  | 0  | 0 |

S7=0
exor(H8,V8)=1    exor(H8,V8)=0

| V7 | H7 | V8 0 | 1 |
|----|----|------|---|
| 0  | 0  | 0    | 1 |
| 0  | 1  | 1    | 1 |
| 1  | 1  | 1    | 1 |
| 1  | 0  | 1    | 1 |

| V7 | H7 |   |
|----|----|---|
| 0  | 0  | 1 |
| 0  | 1  | 0 |
| 1  | 1  | 0 |
| 1  | 0  | 0 |

| | | H8,H7 | | | |
| --- | --- | --- | --- | --- | --- |
| | | POSITIVE | | NEGATIVE | |
| | V8,V7 | 00<br>0~128 | 01<br>128~255 | 11<br>-128~-1 | 10<br>-256~-128 |
| POSITIVE | 00<br>0~128 | 7F(H) | 7F(H) | 00 | 80(H) |
| | 01<br>128~255 | 7F(v) | 7F(v) | 7F(v) | xx |
| NEGATIVE | 11<br>-128~-1 | xx | 7F(H) | 80(H) | 80(H) |
| | 00<br>-256~-128 | 80(v) | xx | 80(v) | 80(v) |

| exor(V8,V7) | V SIGNAL MSB | H SIGNAL MSB | OUTPUT PREDICTION VALUE | NOTE |
| --- | --- | --- | --- | --- |
| 1 | 0 | X | 0111 1111 (7F) | V SIGNAL: AT LEAST 128 |
| | 1 | X | 1000 0000 (80) | V SIGNAL: NOT MORE THAN -129 |
| 0 | X | 0 | 0111 1111 (7F) | V SIGNAL: 8bit RANGE,<br>H SIGNAL: POSITIVE |
| | X | 1 | 1000 000 (80) | V SIGNAL: 8bit RANGE,<br>H SIGNAL: NEGATIVE |

OVERFLOW AND UNDERFLOW PROCESSING CIRCUIT OF A BINARY ADDER

BACKGROUND OF THE INVENTION

1. Field of the Invention

The present invention relates to an overflow-underflow processing circuit of a binary adder. More particular, the present invention relates to a processing circuit that processes binary overflow and underflow generated in binary arithmetical operation.

2. Description of the Background Art

In general, the notation of a digital code includes BCD code, Gray code in which the Hamming distance is always 1, two's complement, one's complement, straight binary and signed binary. All of these codes have the numerical range that can be expressed by a number of bits limited. For example, in a 4-bit straight binary, only 0–15 can be expressed. In two's complement of 4 bits, only –8~7 can be expressed.

In digital signal processing, the number of bits of a signal is often limited in advance. When these digital codes are added and the output obtained by the addition exceeds the range that can be expressed by the number of bits of the output signal, overflow or underflow occurs. In this case, the signal at the output of the adder does not indicate a correct value. It is necessary to carry out a process that converts the added result to a value within a range that can be expressed by the number of bits of the output.

Such an overflow/underflow process conventionally includes the method of: (1) carrying out an add operation in which overflow/underflow does not occur to make determination on the basis of the obtained sum output; and for mutual two's complement and straight binary of the same bits, (2) making determination using a carry out of the adder.

Conventional straight binary will be described hereinafter. In the case of straight binary, the range of an input is at least 0. Only overflow occurs, and an underflow where the output becomes less than 0 will not occur. The presence of an overflow is determined on the basis of the fact that the carry-out signal is always 1. For example, in the case where the output is a straight binary of 4 bits as in the following expression (1), an overflow can be identified when the carry-out signal of a full adder of the fourth bit is 1. Thus, presence of an overflow can be determined with the carry-out signal of the fourth bit.

$$\text{calculation output} \quad \frac{\begin{array}{r}1111\\0001\end{array}}{1\ 0000} \tag{1}$$

carry-out signal   $\overleftarrow{1}$

Because only overflow occurs, the value to be output is the maximum value of the straight binary. In other words, all the bits should be 1. The entire output is made 1 using a carry-out signal.

In the case of two's complement, the method for straight binary cannot be used since there is a possibility of also an underflow. Various methods have been evaluated to speed the overflow/underflow determination in two's complement. A bit expansion method which is one of these various methods will be described hereinafter. The method of adding the number of bits expressible of a correct output is carried out for making determination whether the obtained new output is within the range expressible by the eventual used number of bits. This is a basic method that can be used for any overflow/underflow determination. This will be described in detail with an overflow/underflow determination circuit of 7-bit two's complements that express –64~63. The added output of 7-bit two's complements with each other takes a value within the range of –128~126. Therefore, the input is expanded by 1 bit to carry out an add operation of 8 bits. The more significant 3 bits of the 8-bit added result and the range of the value thereof are as follows:

| More significant 3 bits of 8-bit adder and numeric value | |
|---|---|
| 011 | 96 ~ 127 |
| 010 | 64 ~ 95 |
| 001 | 32 ~ 63 |
| 000 | 0 ~ 31 |
| 111 | –32 ~ –1 |
| 110 | –64 ~ –33 |
| 101 | –96 ~ –65 |
| 100 | –128 ~ –97 |

When the more significant 2 bits differ, the output is at least 65 or not more than –64. Therefore, determination is made of an overflow/underflow. An output prediction value at the occurrence of an overflow/underflow is generated using the most significant bit of the output of the added calculation. In the case of an overflow, since the MSB of the added calculation output is 0, MSB is set to 0, and all the other bits are set to 1 using an inverted signal of the MSB. In the case of an underflow, since the MSB of the added calculation output is 1, the MSB is set to 1 and all the other bits are set to 0 using the inverted signal of the MSB.

This bit expansion is a general method. In the case of straight binary, bit expansion can be carried out by complementing all the bits to be expanded with 0. In the case of two's complements, bit expansion can be carried out by complementing all the bits to be expanded with the most significant bit prior to expansion.

Although a method of carrying out overflow/underflow determination was described on two's complement, any overflow/underflow determination can easily be made as long as bit expansion is carried out to obtain a correct output. For example, when overflow/underflow processing is to be carried out on straight binary (0~127), determination is made of an overflow/underflow when the most significant bit of the sum output after bit expansion is 1 (sum output is negative), whereby all the output bits are set to 0.

When an overflow/underflow process is to be carried out on 6-bit two's complement (–32~31), determination of an overflow/underflow is made when all the more significant 3 bits are not identical. Generation of an output is identical to the case of a 7-bit two's complement although there is slight difference in the generated value.

The above-described method has a disadvantage of increase in the number of transistors since the number of full adders for bit expansion is increased in order to carry out the bit expansion. Furthermore, the calculation time period is increased due to increase in the carry propagation path. The calculation was time consuming since determination of an overflow/underflow is made using the sum/carry of the most significant bit.

SUMMARY OF THE INVENTION

In view of the foregoing, a main object of the present invention is to provide an overflow-underflow processing circuit of a binary adder that speeds the overflow/underflow process and that allows reduction of the number of transistors.

The present invention includes an overflow-underflow processing circuit of a binary adder for processing an overflow/underflow signal in adding binaries with an adder. The overflow-underflow processing circuit of a binary adder includes an overflow/underflow signal selecting circuit for generating a plurality of signals which become candidates for an overflow/underflow determination signal using an input signal of the adder to select a candidate signal using a carry-out signal or a sum signal of the adder.

According to the present invention, a plurality of candidate signals of an overflow/underflow determination signal are generated using an input signal of the adder, and a candidate signal is selected using a carry-out signal or a sum signal of the adder. The present invention can be realized with a reduced number of semiconductors, and the power consumption can be reduced. Furthermore, the operation speed and the speed margin can be improved.

In a preferable embodiment, an output is generated when an overflow/underflow occurs at the most significant bit of an input.

According to another aspect of the present invention, a processing circuit is provided for adding a plurality of data of N bits with an adder to limit the number of digits to N-m bits for processing an overflow/underflow. A plurality of signals indicating presence of overflow/underflow are generated in advance with a signal including the more significant bits of a plurality of data of N bits. One of the plurality thereof is selected using a signal including a carry-out signal or a sum signal of the adder.

According to a more preferable embodiment of the present invention, a signal indicating an overflow/underflow is generated with a function of data of the more significant m bits of the plurality of data of N bits when overflow/underflow occurs.

According to a further aspect of the present invention, a processing circuit is provided for adding data of N bits of straight binary and N-bit two's complement with an adder to obtain a N-bit straight binary. An overflow/underflow determination signal is output according to an exclusive OR of the most significant bit of the two's complement input and the carry-out signal.

According to a further preferable embodiment, an output prediction value at the time of an overflow/underflow is generated by the most significant bit of the two's complement input or the most significant bit of the straight binary input.

According to still another aspect of the present invention, in a binary adding calculation where a N-bit straight binary signal, a N-bit two's complement signal, and a signal having that N-bit two's complement multiplied by a constant coefficient are added using a 3-input adder of a carry save type, determination is made of an overflow/underflow according to an exclusive OR signal of a carry-out signal obtained from the result of adding a sum signal of each of the most significant bit of the 3 inputs and a carry-out signal having the inputs of second most significant bit of the 3 inputs added, and a sign bit of the two's complement signal.

In a binary adder carrying out a 3-input calculation using a carry save type 3-input adder wherein a N-bit straight binary A, a (N−1) bit two's complement B, and a (N−2) bit two's complement C are added to output a N-bit straight binary D, when a carry-out signal of a full adder wherein a signal of the sum of each most significant bit An, Bn, Cn of the 3 inputs and the inputs of the second most significant bits of the 3 inputs are added is Co, determination is made of an overflow/underflow according to the logic of/Co·An·(Bn·Cn)+Co·/An·(/Bn+/Cn). "1" indicates an inverted signal.

In an adder adding two's complement of the horizontal N bits and the vertical N bits with each other for obtaining a N−1 bit two's complement output, there are provided an overflow/underflow presence determination circuit for making determination of the presence of an overflow/underflow on the basis of each of the most significant bits in the horizontal and vertical directions and the logic values of the second most significant bits in the horizontal and vertical directions according to the added output of the complements with each other, and an output prediction value generation circuit for providing the logic values of the most significant bit and the second most significant bit in the vertical direction or the logics value of the most significant bit and the second most significant bit in the horizontal direction as an output prediction value according to the output of determination of the presence of an overflow/underflow.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a diagram showing the relationship between the MSB of an input and an overflow/underflow state according to an embodiment of the present invention.

FIG. 7 is a diagram showing a calculation equation and input/output according to another embodiment of the present invention.

FIG. 8 is a diagram for describing a concept according to another embodiment of the present invention.

FIG. 9 is a diagram showing a truth table of an overflow/underflow determination circuit of FIG. 8.

FIG. 10 shows an example of a circuit for implementing the logic of the truth table of FIG. 9.

FIG. 13 is a diagram showing specifically another embodiment of the present invention.

FIG. 15 shows calculation of adding 9-bit two's complements with each other to output two's complement of a 8-bit range.

FIG. 17 shows the truth table of FIG. 16 where S7=1, 0.

DESCRIPTION OF THE PREFERRED EMBODIMENTS

Figures 1, 2, 3:
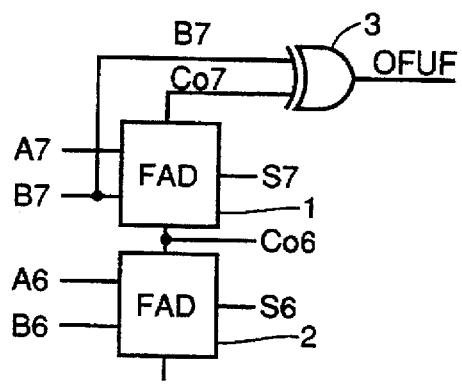
FIG. 1 is a diagram for describing the concept of a first embodiment of the present invention.
FIG. 2 is a diagram showing a truth table according to an embodiment of the present invention.
FIG. 3 is a block diagram showing an overflow/underflow determination circuit according to an embodiment of the present invention.

FIG. 1 is a diagram for describing a concept of an embodiment of the present invention. According to an embodiment of the present invention, an overflow/underflow process is carried out for adding two's complement to a straight binary (STB) to obtain a straight binary of the same bit length. In the case of 8 bits, straight binary can represent 0~255, and two's complement (2sC) can represent −128~127, so that the added output takes a value from −128 to 382. In the present embodiment, the output is limited to a straight binary of 0~255. Calculation in the present embodiment implies calculation required to avoid generation of an overflow/underflow. In the addition of 8 bits with each other, for example, the output takes a value of −128~382 as shown in FIG. 1, requiring an output of 10 bits. Even if a two's complement overflow/underflow process is used, an adder of 9 bits is required. In the present embodiment, adding 8 bits with each other or a two's complement overflow/underflow process can be calculated with 8 bits.

FIG. 2 shows a truth table according to an embodiment of the present invention. Bit expansion is merely generation of a function of the MSB of the original binary in order to obtain a correct sum output. In practice, the code and the magnitude of the correct sum output are determined depending upon the MSB and the carry-in signal. Therefore, a truth table as shown in FIG. 2 can be created for the presence of an overflow/underflow for all the combinations of the MSB of the input (A7, B7) and a carry-in signal Co6 to the full adder of the MSB. In FIG. 2, the second column with Co6 denoted in the first row indicates the presence of OF, UF of the 3 signals of A7, B7 and Co6. When A7, B7, and Co6 are determined, Co7 which is the carry-out signal from the MSB is determined in one to one correspondence. However, the third column with Co7 denoted in the first row indicates the state of signal Co7 determined by the three signals of A7, B7 and Co6. The fourth column with exor (B7, Co7) denoted in the first row indicates the exclusive OR value of B7 and Co7. In FIG. 2, OK indicates that no overflow/underflow occurs, UF indicates underflow, and OF indicates overflow.

It is apparent from the figure that determination of an overflow/underflow can be made with the parameters of A7, B7, and Co6, or B7 and Co7. The process can be speeded according to determination made with parameters A7, B7 and Co6 by using the carry-out signal Co6 of a lower significance. However the logic becomes somewhat complicated since determination of an overflow/underflow is made for all the combinations of the 3 inputs. In comparison, when parameter exor (B7, Co7) is used, the determination is reduced in speed by usage of parameter Co7. However, the logic can be formed with a fewer number of transistors.

In practical usage, reduction in the number of transistors is preferred if sufficient speed margin can be guaranteed for the operation speed.

FIG. 3 is a block diagram showing an overflow/underflow determination circuit according to an embodiment of the present invention, realizing the truth table of FIG. 2. Referring to FIG. 3, an overflow/underflow determination circuit includes full adders 1 and 2, and an EXOR gate 3. Inputs A7 and B7 are applied to full adder 1. Inputs A6 and B6 are applied to full adder 2. Input B7 and a carry-out signal Co7 from full adder 1 are applied to EXOR gate 3. EXOR gate outputs a signal indicating an overflow OF or an underflow UF.

Because a proper sum output cannot be calculated according to the above method, an overflow/underflow signal cannot be generated using the sum output. However, the MSB of the two's complement input indicates positive/negative, and the MSB of the straight binary indicates the magnitude thereof. Therefore, these MSBs and generation of underflow/overflow are closely related to each other. Output of an overflow/underflow can be predicted using this relationship.

FIG. 4 shows the relationship of the MSB of an input and an overflow/underflow state. In FIG. 4, the MSB (B7) of the two's complement input B is inverted to generate an output when an overflow/underflow occurs. This is because the output in overflow/underflow has a great fan-out and it is necessary to insert an inverter for driving. The number of transistors can be reduced by using inversion of the MSB of the two's complement input.

Figure 5:
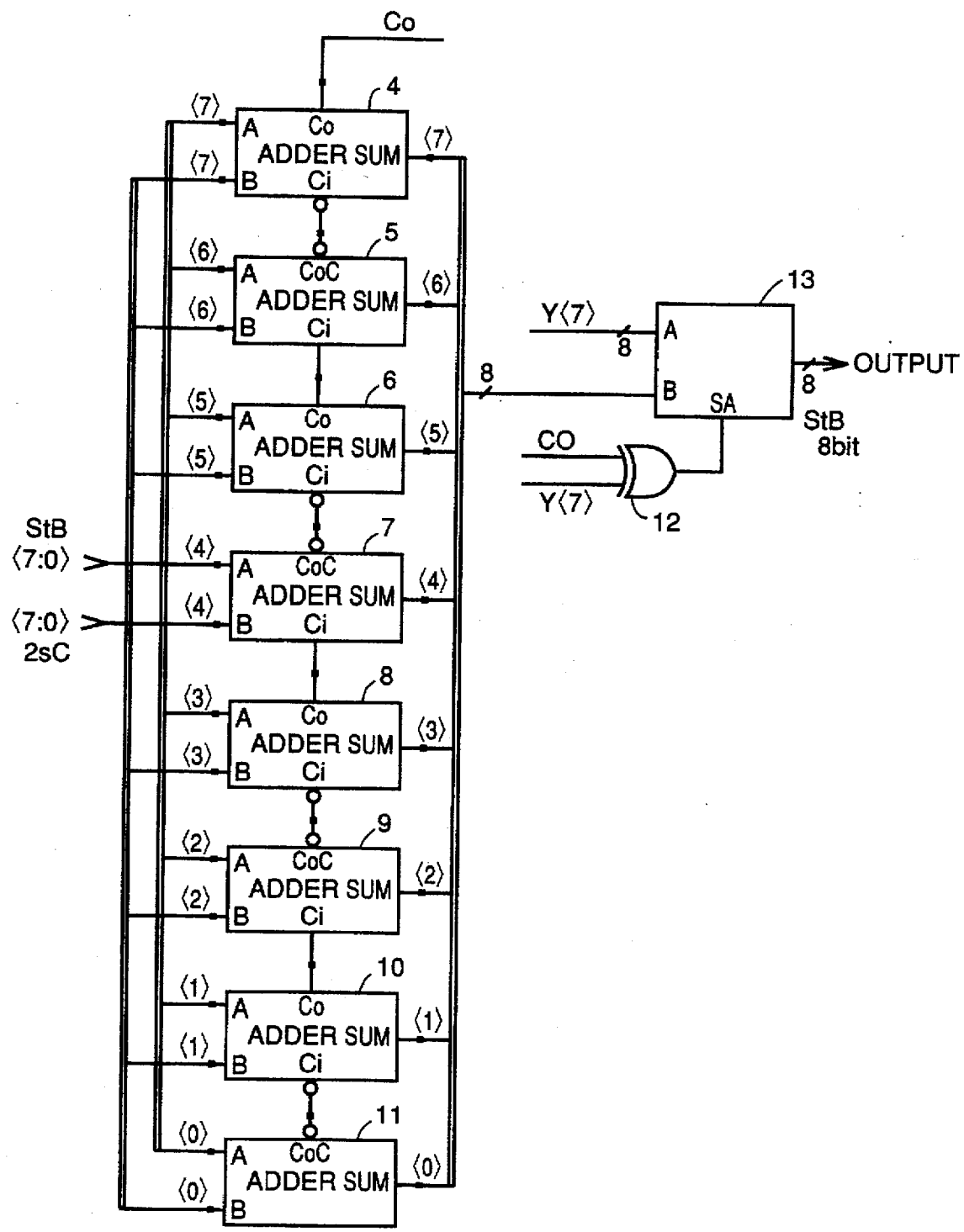
FIG. 5 specifically shows an embodiment of the present invention.

FIG. 5 is a circuit diagram specifically showing an embodiment of the present invention. Referring to FIG. 5, there are eight full adders 4-11. Data X (7~0), Y (7~0) are applied to inputs A and B of each full adder. Each of full adders 4-11 carries out adding of each data X (7) and Y (7), . . . , X (0) and Y (0). The added output is individually applied to input B of a selector 13, whereby each carry-out signal is input to the full adder of a higher level. Data Y (7) is applied to input A of selector 13. Selector 13 is switched by an output of an EXOR gate 12. Data Y (7) and an overflow/underflow signal CO from full adder 4 of the most significant bit are applied to the input of EXOR gate 12. Determination of an overflow/underflow is made according to data Y (7) and digital flow signal CO of EXOR gate 12. According to this output of EXOR gate 12, selector 13 selects data A and B to output a 8-bit straight binary signal.

Figure 6:
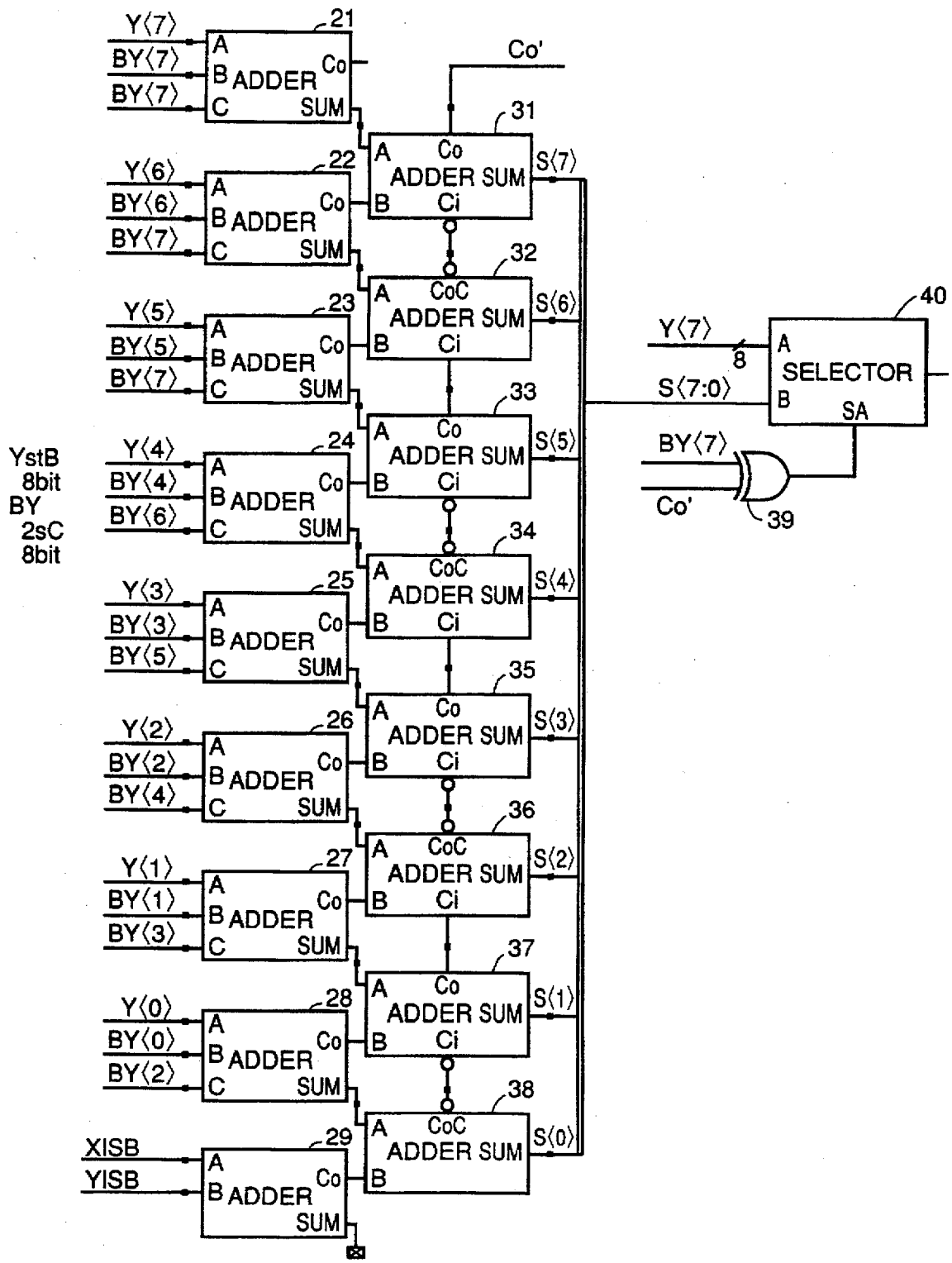
FIG. 6 is a circuit diagram showing another embodiment of the present invention.

FIG. 6 is a circuit diagram showing another embodiment of the present invention. In the present embodiment, a calculation of Y+BY+BY/4 is carried out. More specifically, a BY signal of 5/4 times (two's complement) is added to signal Y of the straight binary to obtain a signal B of a straight binary of the same number of bits. Full adders 21-29 are 3-input adders. Y (7), BY (7), BY (7), . . . , Y (0), BY (0), BY (0), BY (2), X1SB, Y1SB are input, respectively. Out of full adders 21-29, the partial added output of each of full adders 21-28 is applied to 2-input full adders 31-38. The partial overflow/underflow signal Co of full adders 22-29 are applied to full adders 31-38. Each overflow/underflow signal Co of each of full adders 31-38 is applied to a full adder of a higher level. Overflow/underflow signal Co' of full adder 31 of the most significant bit is applied to an EXOR gate 39 with data BY (7). The added outputs of full adders 31-38 are applied to a selector 40 with data Y (7) to be selected according to an output of EXOR gate 39.

The operation of the embodiment shown in FIG. 6 will be described hereinafter.

In the present embodiment, bit expansion is carried out on 10 bits in order to add three values of the 8 bits. Because signal Y is a straight binary, the eighth bit and the ninth bit are complemented with 0. Because signal BY is a two's complement, the bit expanded by BY7 is complemented. This is indicated in the following expression (2):

$$
\begin{array}{ccc}
\overline{BY7} & \overline{BY7} & \overline{BY7} \\
\overline{BY7} & \overline{BY7} & \overline{BY7} \\
0 & 0 & 0 \\
\hline
T9 & T8 & T7 \\
U9 & U8 & U7 \quad U7 \\
\hline
& \overleftarrow{Co'\ 0} & \\
\hline
S9 & S8 & S7
\end{array}
\quad (2)
$$

More specifically, the actual expansion bits when (Y7, BY7, Co')=(1, 1, 0) are shown in the following expression (3).

$$
\begin{array}{ccc}
1 & 1 & 1 \\
1 & 1 & 1 \\
0 & 0 & 1 \\
\hline
0 & 0 & 1 \\
1 & 1 & 1 \\
\hline
& \overleftarrow{0} & \\
\hline
1 & 1 &
\end{array}
\quad (Co') \quad (3)
$$

As shown in FIG. 6, Co' is a carry-out signal from adder 31 of the eighth bit that adds a partial added signal and a partial overflow/underflow signal. Upon determination of this signal, the more significant 2 bits of the added output are determined in one to one correspondence by overflow/underflow signal Co'. For example, in the above equation (3), the more significant 2 bits of the sum is 11. When (Y7, BY7, Co')=(1, 0, 1), the more significant 2 bits of the sum is 01 as shown in the following expression (4). The magnitude of the sum output can be identified from the sum output (S9, S8) shown in expression (2) of the more significant 2 bits. For example, if the more significant 2 bits is 01, the sum output is within the range of 256~511. If 00, the range is 0~127; if 11, the range is −256~−1; and if 10, the range is −512~−257.

$$
\begin{array}{ccc}
0 & 0 & 0 \\
0 & 0 & 0 \\
0 & 0 & 1 \\
\hline
0 & 0 & 1 \\
0 & 0 & 0 \\
\hline
& \overleftarrow{0} & \\
\hline
0 & 1 & 1
\end{array}
\quad (Co') \quad (4)
$$

FIG. 7 shows the truth table of the calculation of Y+5/4BY and its calculation method. Columns E and F of FIG. 7 show the range of the sum output according to the combination of (Y7, BY7, Co') according to the above-described calculation method. Columns G and H of FIG. 7 show the range according to exor (BY7, Co'). The present calculation is limited to a 8-bit straight binary output, so that an output other than the range of 0~255 becomes the object of limitation. The sum output which becomes the object limitation has all the exor (BY7, Co') indicate 1. It is appreciated that limit determination of this calculation can be made with exor (BY7, Co').

FIG. 8 shows a calculation and input/output according to anther embodiment of the present invention. FIG. 9 is a diagram for describing the concept according to this embodiment of the present invention. FIG. 10 shows a truth table of this embodiment.

The embodiment of FIG. 8 is an overflow/underflow determination circuit that calculates an inverse matrix G signal of a MUSE transmission method which is the broadcasting method of a Japanese high definition television. A calculation of an inverse matrix G signal (referred to as XTM-G signal hereinafter) is expressed by the following equation as shown in FIG. 8:

$$Y - \tfrac{1}{2} \cdot RY - \tfrac{1}{4} \cdot BY$$

This XTM-G calculation generates a G signal out of the RGB signals from a luminance Y signal and a color difference RY·BY signal. It is characterized in that it is a 3-input calculation, and that subtraction is carried out by bit-shifting RY·BY.

The overflow/underflow determination circuit of the present embodiment can be realized on the basis of a 3-input adder and a subtractor according to the determination. Because there is only one carry propagation path with a carry save adder type used for 3-input adding, the degree of freedom of the wiring in the arranged wiring is increased. Subtraction using inversion has an advantage of eliminating the need of logic 1 for the carry input.

The concept of an overflow/underflow determination circuit of a XTM-G signal calculation is shown in FIG. 9. Referring to FIG. 9, 3-input full adders 41, 42, . . . receive /Y7 (/indicates an inverted signal), RY7, and BY7, and /Y6, RY7 and BY7. A carry-out signal of each of full adders 41 and 42 is applied to adders 43 and 44. An overflow/underflow signal of full adder 44 is applied to full adder 43 of a higher level. Overflow/underflow signal Co is output from full adder 43.

In the calculation of the present embodiment, there are 2 two's complements with a bit shift and subtraction. Therefore, a determination method similar to that shown in the embodiment of FIG. 1 cannot be used. Therefore, using overflow/underflow signal Co as a parameter, an overflow/underflow truth table for all the states of RY7, BY7, Y7 is created. In producing a truth table, bit expansion is carried out by calculation, and calculation is carried out to identify the output. The resulting truth table is shown in FIG. 10. In FIG. 10, Co, /Co imply that the overflow/underflow signal is determined by the value of Co. There is an overflow/underflow when they indicate 1. The range of the numeric values indicated by the small-sized characters are all in the range of the sum output expressible by the values. For example, when RY7=1, RY7/2 indicates that it takes a value of −64~−½.

Figure 11:
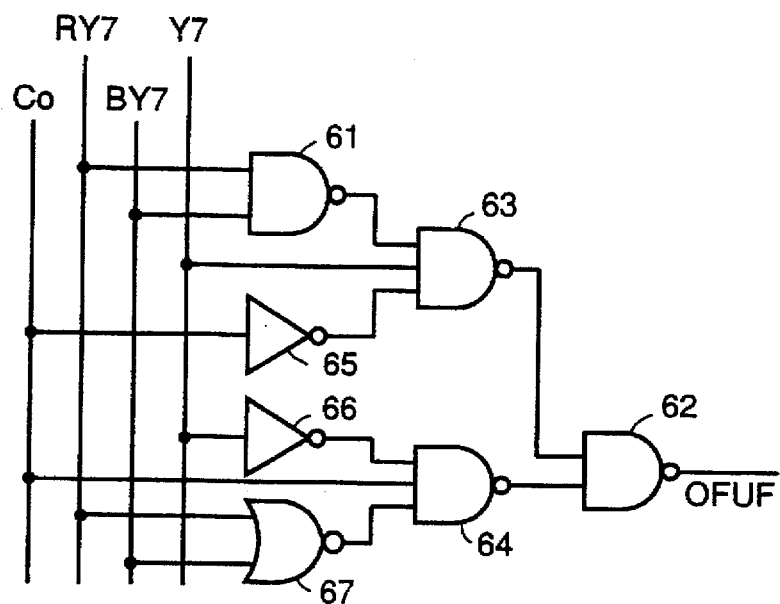
FIG. 11 shows an example of an overflow/underflow flag determination circuit according to another embodiment of the present invention.
Figure 12:
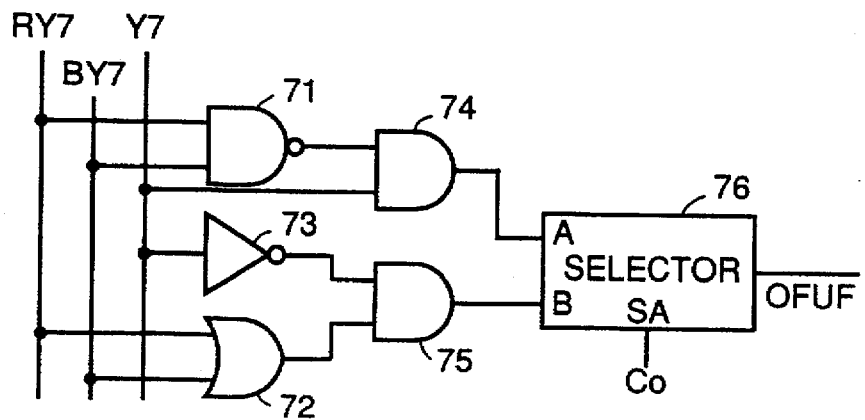
FIG. 12 is a diagram in which the truth table of FIG. 9 is developed.

FIG. 11 shows an example of a circuit for realizing the logic of the truth table of FIG. 10. FIG. 12 shows an example of an overflow/underflow flag determination circuit. FIG. 13 shows development of the truth table of FIG. 10.

Indicating a logic circuit in which Co of the truth table of FIG. 10 is developed, a logic circuit includes 2-input NAND gates 61 and 62, 3-input NAND gates 63 and 64, inverters 65 and 66, and a 2-input NOR gate 67, as shown in FIG. 11. RX7 and BY7 are applied to NAND gate 61 and NOR gate 67. Inverter 65 inverts Co which is applied to NAND gate 63. An output of NAND gate 61 and Y7 are applied to the other inputs of NAND gate 63. The output of NAND gate 63 is applied to one input terminal of NAND gate 62. NAND gate 64 receives an output of NOR gate 67, Co, and Y7 inverted by inverter 66. The outputs of NAND gates 63 and 64 are applied to NAND gate 62.

In the circuit of FIG. 11, three stages of NAND gates and NOR gates are connected. Considering the input capacitance of the NAND gates and the NOR gates, there is a disadvantage in the speed.

In order to improve the speed, an overflow/underflow signal is formed by a selector logic as shown in FIG. 12. In the embodiment shown in FIG. 12, RY7 and BY7 are applied to NAND gate 71 and OR gate 72. An output of NAND gate 71 and Y7 are applied to AND gate 74. An AND gate 75 receives an output of OR gate 72 and Y7 inverted by an inverter 73. The outputs of AND gates 74 and 75 are applied to a selector 76. Selector 76 switches the outputs of AND gates 74 and 75 according to an overflow/underflow signal Co. According to the embodiment shown in FIG. 12, the gate carrying out the determination of an overflow/underflow signal Co and determination of an overflow/underflow flag can be formed by two stages, i.e. a stage of NAND gate 71, inverter 73 and OR gate 72, and a stage of AND gates 74 and 75, to allow speeding. A truth table of the overflow/underflow flag determination circuit of FIG. 12 is shown in FIG. 13.

Figure 14:
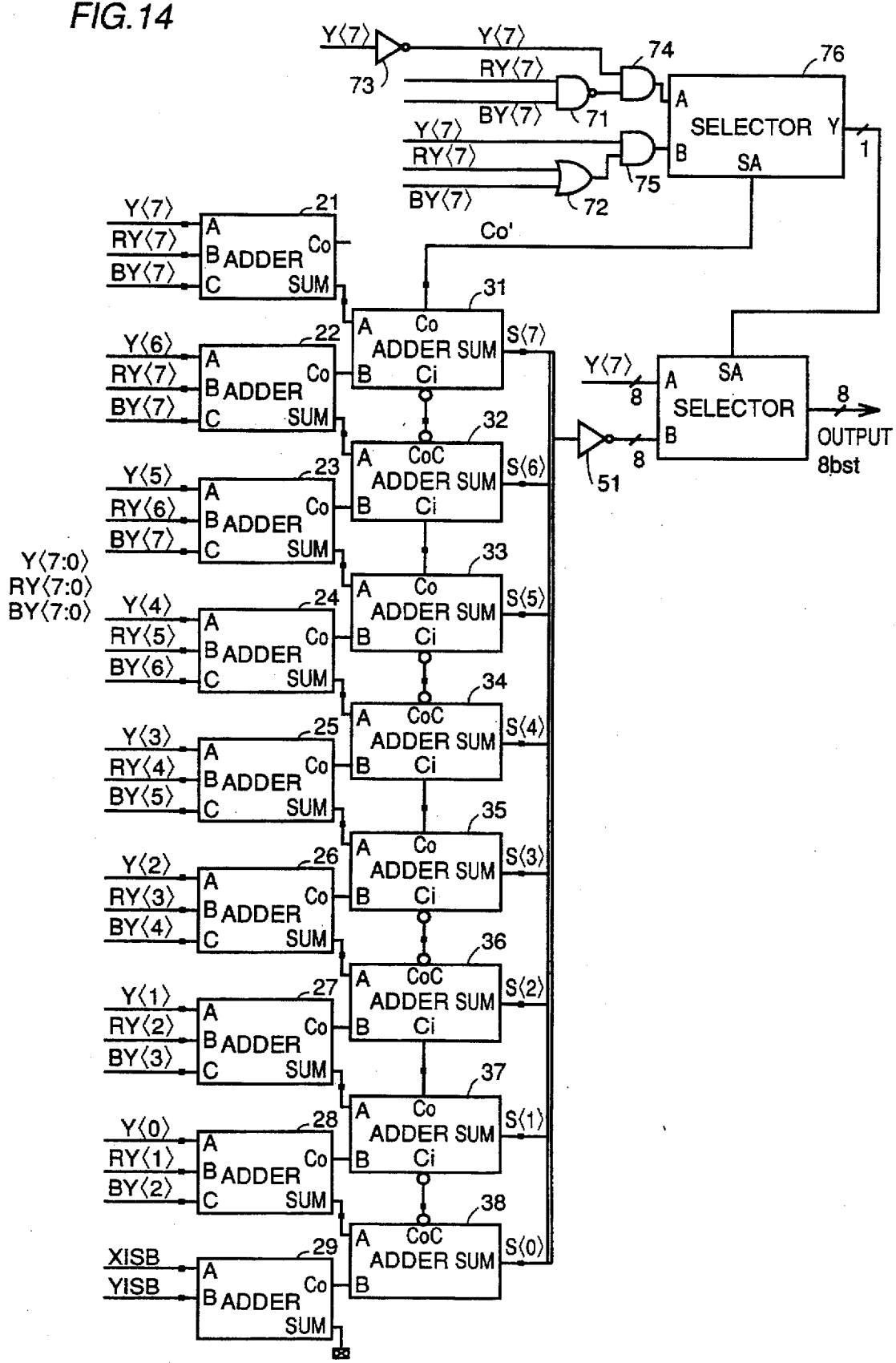
FIG. 14 shows a further embodiment of the present invention.

FIG. 14 specifically shows another embodiment of the present invention. Similar to FIG. 6, the embodiment shown in FIG. 14 includes full adders 21–29 and 31–38. An overflow/underflow signal output from full adder 31 is applied to the overflow/underflow flag determination circuit of FIG. 12. An output of selector 76 within that overflow/underflow flag determination circuit is provided to a selector 52. Selector 52 receives Y(7) and an output of adder circuits 31–38 inverted by inverter 51. According to an output of selector 76, selector 52 switches inputs A and B for output.

Next, an embodiment will be described in which the present invention is applied to an overflow/underflow determination circuit of a calculation (HVMIX) that adds a contour compensation amount of the horizontal direction and a contour compensation amount of the vertical direction.

FIG. 15 shows a calculation where 9-bit two's complements are added with other for providing a two's complement in the range of 8 bits. The output of the present embodiment is 8 bits. In order to carry out an overflow/underflow process with adders of 8 bits, a determination of the presence of an overflow/underflow is made by calculation for all the combinations of horizontal direction most significant bit H8, the second most significant bit H7, vertical direction most significant bit V8, the second most significant bit V7, and the carry-in signal to the adder of the seventh bit.

Figure 16:
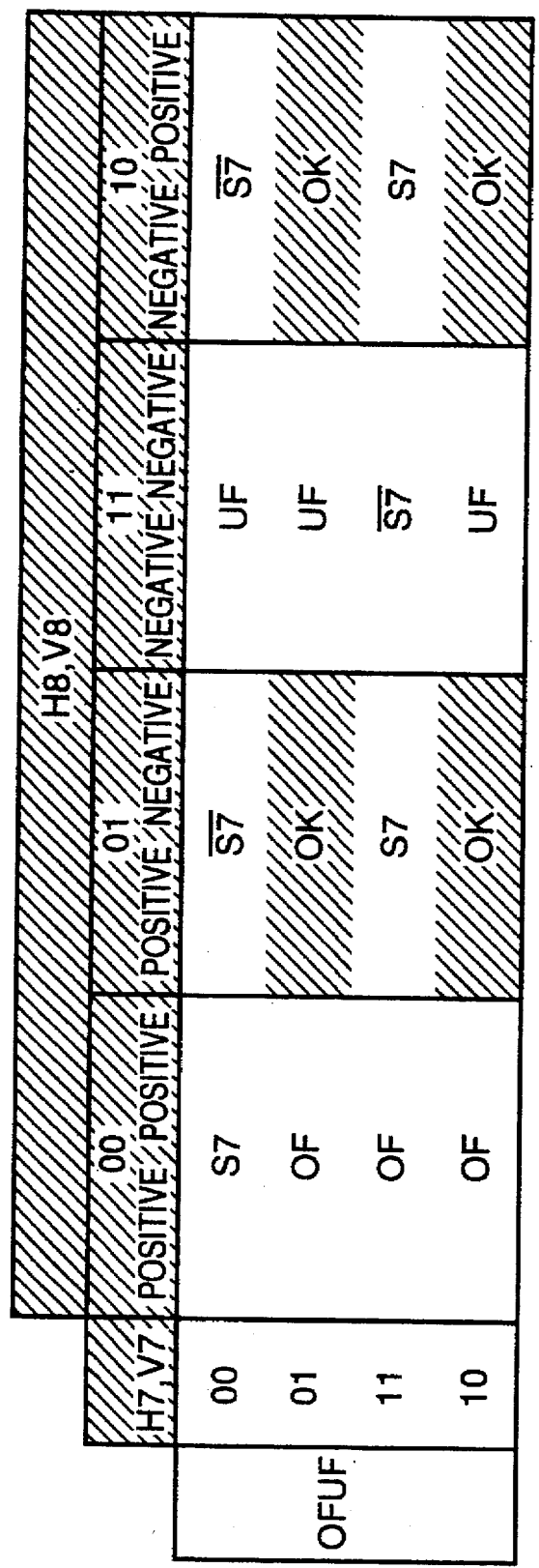
FIG. 16 shows a truth table of an overflow/underflow determination signal.

FIG. 16 shows a truth table of the overflow/underflow determination signal of the present embodiment. The truth table of FIG. 16 concerns H7, H8, V7, V8 and the seventh bit added output S7. It is sorted in view of (H8, V8) and (H7, V7) with added output S7 as the parameter. Here, H8 and V8 indicate the signs, and H7 and V7 indicate the magnitude. In this truth table, OK indicates that no overflow/underflow occurs, OF indicates overflow, and UF indicates underflow. Added output S7 and an inversion thereof each taking 1 indicates an overflow/underflow.

FIG. 17 shows the truth table of FIG. 16 when S7=1, 0. A further division can be achieved from the truth table of FIG. 17 to obtain an exclusive OR of H8 and V8 for each of S7=1 and S7=0 to make determination of the match of the signs of the 2 inputs. By the sub-division shown in FIG. 17, exor (B8, H8) can be used in common in S7=0 and S7=1. Furthermore, the logic thereof can be simplified.

Figures 18, 19, 20:
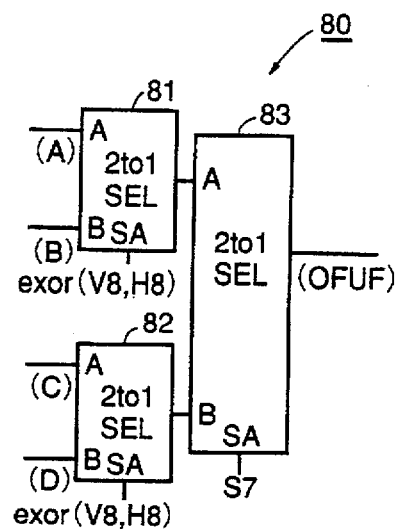
FIG. 18 shows a select circuit for developing the logic of FIG. 17.
FIG. 19 is a logic diagram of output prediction.
FIG. 20 shows a table of output prediction values.

FIG. 18 shows an overflow/underflow presence determination circuit 80 for development of the logic of FIG. 17. Overflow/underflow presence determination circuit 80 includes three 2-input 1-output selectors 81–83. Selector 81 selects A or B according to an output of exor (B8, H8). Selector 82 selects C or D according to an output of exor (V8, H8). Selector 83 selects an output of selector 81 or 82 as an overflow/underflow signal according to added output S7. A–D are generated in advance as overflow/underflow candidate values by H7, V7, H8 and V8. A specific example will be described afterwards with reference FIG. 22.

In the above-described embodiment of FIG. 3, an output when overflow/underflow occurs is generated with the most significant bit of the input. In the embodiment of FIG. 6, the output of an overflow/underflow occurrence is generated only with the most significant bit of the input when limited to the case of two's complement of the same bit. In contrast, the present embodiment cannot have an output predication value generated only with the most significant bit of the input since the range of the output is determined by the combination of the more significant 2 bits of the 2 inputs. A method of generating an output prediction value according to the present embodiment will be described hereinafter.

FIG. 19 is a logic diagram of an output prediction. FIG. 19 shows a combination of the more significant 2 bits of the input, the range of the value thereof, and 7F/80 as the prediction value of output in an overflow/underflow occurrence. 7F indicates output of 7F because overflow occurs, and 80 indicates output of 80 because underflow occurs. In the logic diagram shown in FIG. 19, the output prediction value is determined depending upon: (1) if signal V is at least 128, only overflow occurs; (2) if signal V is not more than −129, only underflow occurs; and (3) if signal V is within the range of −128~127, overflow or underflow occurs depending upon whether signal H is positive or negative. Because both V and H are two's complements, these characteristics are valid even if V and H are replaced with each other. By making determination whether signal V is −128~127 with exor (V8, V7), (1) and (2) can be separated from (3). In the case of (1) and (2), separation can be made by prediction an output prediction of an overflow/underflow with the most significant bit of signal V. Because the output prediction value in (3) is determined depending upon whether signal H is positive or negative, it can be generated with the most significant bit of signal H.

Figure 21:
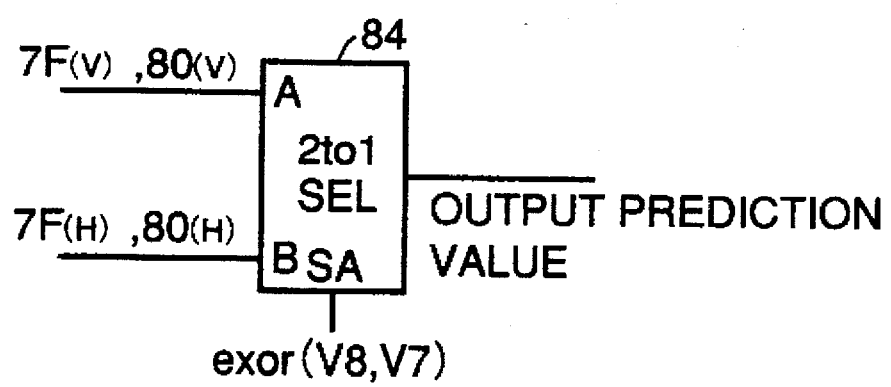
FIG. 21 is a block diagram of an output prediction value generation circuit.

FIG. 20 is a table of output prediction values generated according to the above-described characteristics. FIG. 21 is a block diagram of an output prediction value generation circuit. The output prediction value generation circuit of FIG. 21 selects the above-described (1) (2) or (3) as the output prediction value according to exor (V8, V7) by selector 84.

Figure 22:
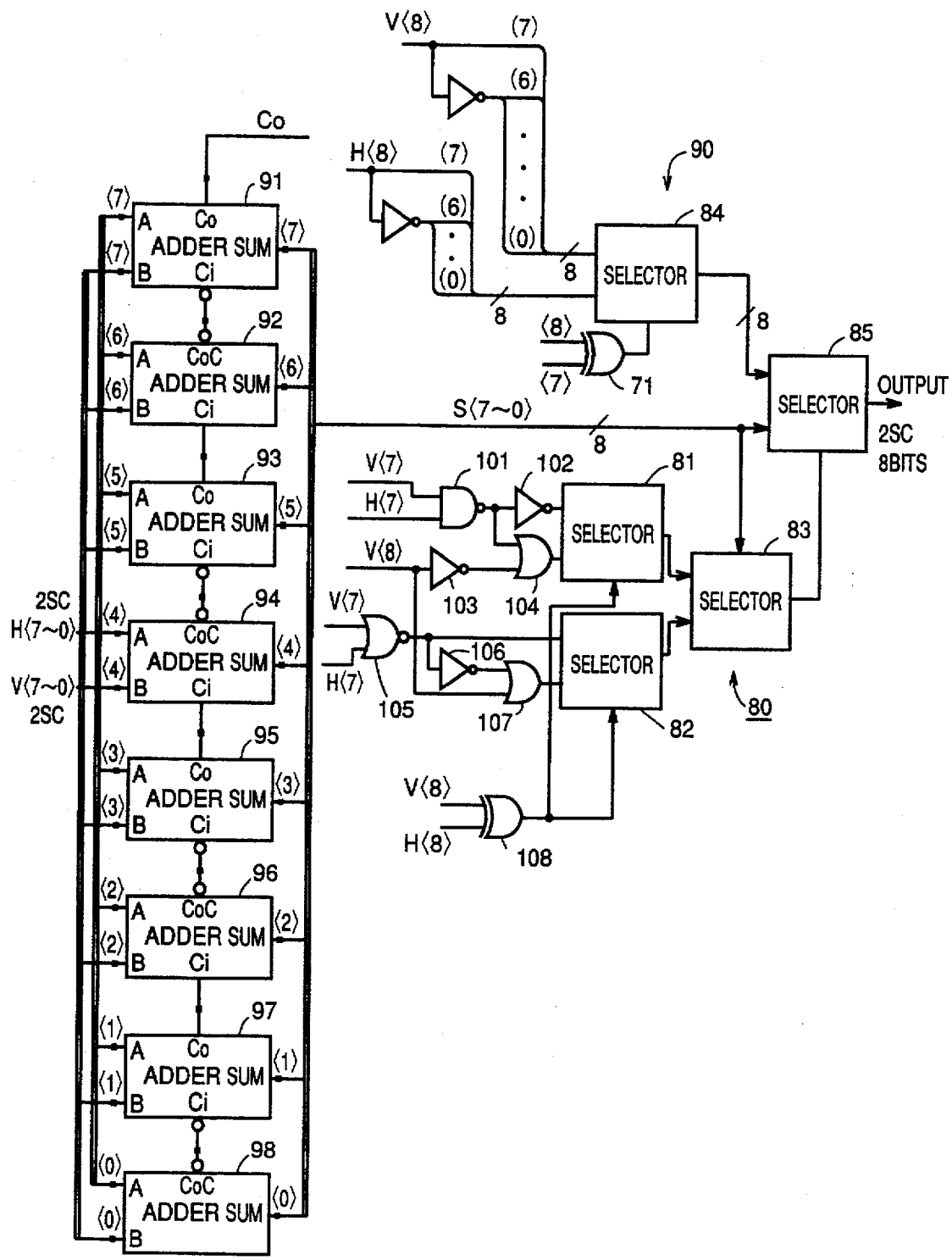
FIG. 22 is a block diagram of still another embodiment of the present invention.

FIG. 22 is a specific block diagram of the present invention incorporating the embodiments shown in FIGS. 15–21. More specifically, full adders 91–98 add horizontal contour correction positive signals H7~H0 of 8 bits and vertical contour correction signals V7~V0 to provide added outputs S7~S0.

Overflow/underflow presence determination circuit 80 includes three 2-input 1-output selectors 81–83 as shown in FIG. 18. Selector 81 receives an inverted signal of V7·H7 via inverter 102 from NAND gate 101 at input A, and an inverted signal of V8+V7·H7 via inverter 103 and OR gate 104 at input B. Selector 82 receives an inverted signal of V7+H7 via NOR gate 105 at input A, and V8+(V7+H7) via NOR gate 105, inverter 106, and OR gate 107 at input B.

EXOR gate 108 receives V8 and H8. Selectors 81 and 82 switch each input by an output of EXOR gate 108. More specifically, selectors 81 and 82 respectively select input A when the output of EXOR gate 108 is "1" and input B when the output of EXOR gate 108 is "0". Selector 83 selects the output of selector 81 when the most significant bit S7 of the added output is "0" and the output of selector 82 when S7 is "1".

Output prediction value generation circuit 90 includes selector 84 shown in FIG. 21. Selector 84 receives V7 and inverted bits of V6–V0 as V8 at input A, and H7 and inverted bits of H6–H0 as H8 at input B. V8 and V7 are input to EXOR gate 91 for switching inputs A and B of selector 84. Selector 84 selects input A and input B when the output of EXOR gate 91 "1" and "0", respectively, as an output prediction value which is provided to selector 85.

Selector 85 selects the output prediction value of selector 84 as an overflow/underflow signal when "1" is output from selector 83 of overflow/underflow determination circuit 80, and selects added outputs of full adders 91–98 as no overflow/underflow signal when "0" is output from selector 83.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An overflow-underflow processing circuit for processing an overflow/underflow signal which is generated when binary values are added with an adder, comprising:

generation means for generating a plurality of candidate signals for an overflow/underflow determination signal according to at least one signal including a plurality of the most significant bits of said binary values, and overflow/underflow signal selecting means for selecting any of said candidate signals generated by said generation means in response to one of a carry-out signal and a sum signal of said adder.

2. The overflow-underflow processing circuit according to claim 1, wherein said circuit further comprises means for generating an output according to the most significant bit of an input when an overflow or underflow occurs.

3. An overflow-underflow processing circuit adding a plurality of data of N bits with an adder to limit the number of digits to N-m bits for processing an overflow/underflow signal, said overflow-underflow processing circuit comprising:

generation means for generating in advance a plurality of candidate signals indicating a presence of an overflow/underflow according to at least one signal including a plurality of the most significant n bits of said plurality of data of N bits, and overflow/underflow determination signal generation means responsive to one of a carry-out signal and a sum signal of said adder for selecting one of said plurality of candidate signals as an overflow/underflow determination signal.

4. An overflow-underflow processing circuit of a binary adder comprising:

add means for adding N-bit straight binary data and N-bit two's complement, and overflow/underflow determination signal generation means for providing an overflow/underflow determination signal by an exclusive OR of the most significant bit of said two's complement and a carry out signal output from said add means.

5. The overflow-underflow processing circuit according to claim 4, wherein said overflow-underflow determination signal generation means comprises means for generating an output prediction value according to one of the most significant bits of a two's complement input and the most significant bit of a straight binary input when an overflow or underflow occurs.

6. An overflow-underflow processing circuit of a binary adder, comprising:

a carry save type 3-input add means for adding a N-bit straight binary signal, a N-bit two's complement signal, and a signal having said N-bit two's complement signal multiplied by a constant coefficient, and overflow/underflow determination means for making determination of an overflow/underflow according to an exclusive OR signal of a carry out signal obtained from a result of adding a sum signal of each of the most significant bit of said 3 inputs and a carry-out signal which is the second most significant bits of said 3 inputs added by said add means, and a sign bit of two's complement signal.

7. An overflow-underflow processing circuit of a binary adder comprising:

a carry save type 3-input add means for adding N-bit straight binary A, (N–1) bit two's complement B, and (N–2) bit two's complement C to output N-bit straight binary D, and overflow/underflow determination means for making determination of an overflow/underflow with the logic of:

$$/Co \cdot An \cdot (Bn \cdot Cn) + Co \cdot /An \cdot (/Bn + /Cn)$$

where Co is a carry-out signal output by said 3-input add means adding a sum signal of the respective most significant bits An, Bn and Cn of said 3 inputs and a carry-out signal which is generated when the second most significant bits of said 3 inputs are added.

8. An overflow-underflow processing circuit of a binary adder comprising:

a carry save type 3-input adder for adding N-bit straight binary A, (N–1) bit two's complement B, and (N–2) bit two's complement C for providing a N-bit straight binary D, and overflow/underflow determination means for making determination of an overflow/underflow by selecting any of /Co·An (Bn·Cn) and Co·/An·(/Bn+/Cn) where Co is a carry-out signal output by said 3-input adder adding a sum signal of the respective most significant bits An, Bn and Cn of said 3 inputs and a carry-out signal which is generated when the inputs of the second most significant bits of said 3 inputs are added.

9. An adder for adding two's complements of horizontal direction N bits and vertical direction N bits with each other to obtain an output of N–1 bit two's complement, said adder comprising:

overflow/underflow presence determination means for making determination of an overflow/underflow on the basis of the most significant bits of said horizontal and vertical direction N bits and the value of the second most significant bits of said horizontal and vertical direction N bits, and output prediction value generation means for providing as an output prediction value any of the value of the most significant bit and the second most significant bit of said vertical direction N bits and the value of the most significant bit and the second most significant bit of said horizontal direction N bits according to a determination output of said overflow/underflow presence determination means.

10. An adder according to claim 9, wherein said overflow/underflow presence determination means comprises:

first overflow/underflow determination means for obtaining a logical product of the second most significant bit value A of said horizontal direction N bits and the second most significant bit value B of said vertical direction N bits, a second overflow/underflow determination means for obtaining a negative logical sum of said value A and said value B, third overflow/underflow determination means for obtaining a negative logical sum of the logical product of said values A and B and the most significant bit in the vertical direction N bits, fourth overflow/underflow determination means for obtaining a logical sum of the logical sum of said values A and B and the most significant bit of said vertical direction N bits, first selection means for selecting an output of said first overflow/underflow determination means when an exclusive OR output of each most significant bit of said horizontal and vertical direction N bits is a first value, and selecting an output of said third overflow/underflow determination means when said exclusive OR output is a second value, second selection means for selecting an output of said second overflow/underflow determination means when an exclusive OR output of each most significant bit of said horizontal and vertical direction N bits is a first value and selecting an output of said fourth overflow/underflow determination means when said exclusive OR output is a second value, and overflow/underflow determination means for providing as an overflow/underflow signal the output of said first selection means when the output of said complements added with each other is a second level, and the output of said second selection means when the output of said complements added with each other is a first level.

11. The adder according to claim 9, wherein said output prediction value generation means comprises an exclusive OR gate for providing an exclusive OR of the most significant bit and the second most significant bit of said vertical direction N bits, and selection means responsive to an output of a first level by said exclusive OR gate for providing the most significant bit of said vertical direction N bits as a sign bit and an inverted signal of the most significant bit of said vertical direction N bits as a signal other than a sign bit, and responsive to an output of a second level by said exclusive OR gate to provide the most significant bit of said horizontal direction N bits as a sign bit and an inverted signal of the most significant bit of said horizontal direction N bits as a signal other than a sign bit.

* * * * *